W. G. LLOYD.
REAMER AND AUGER.
APPLICATION FILED JUNE 7, 1909.
952,916.
Patented Mar. 22, 1910.
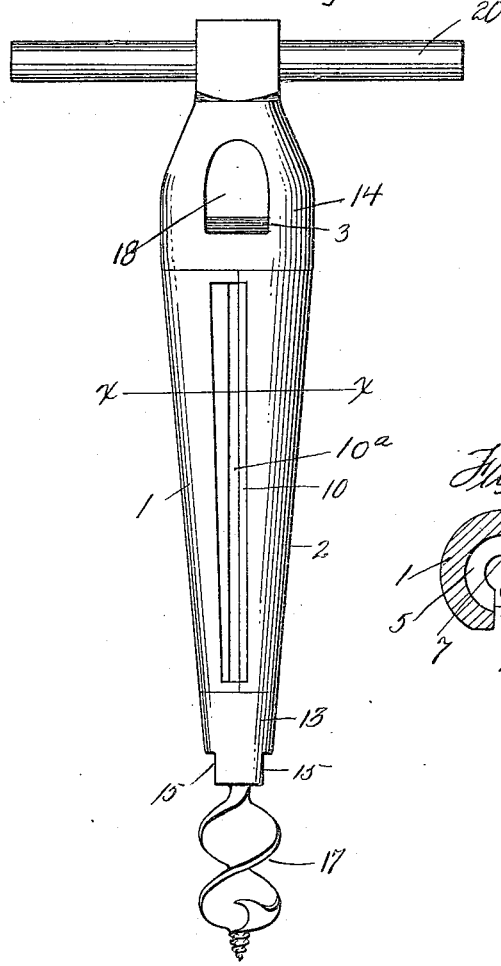
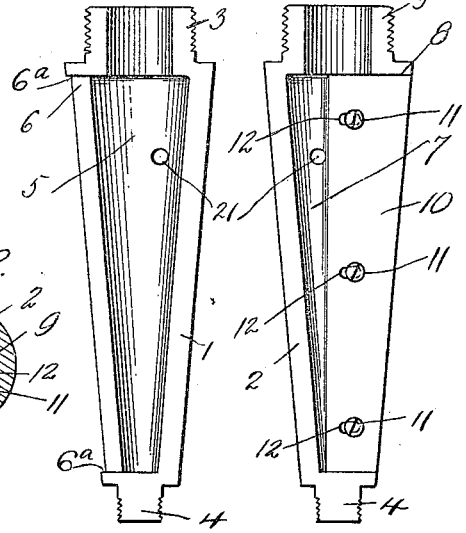
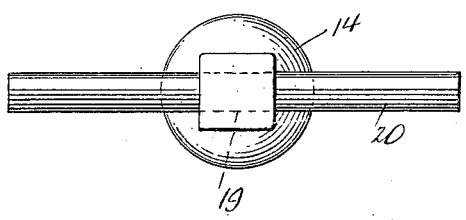
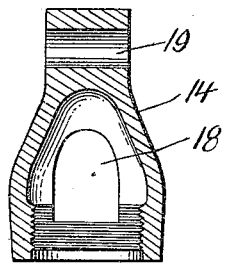
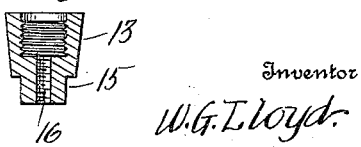
Witnesses
Inventor
W. G. Lloyd
By
Attorneys

UNITED STATES PATENT OFFICE.

WILLIAM G. LLOYD, OF WELLSVILLE, OHIO.

REAMER AND AUGER.

952,916.   Specification of Letters Patent.   Patented Mar. 22, 1910.

Application filed June 7, 1909. Serial No. 500,713.

*To all whom it may concern:*

Be it known that I, WILLIAM G. LLOYD, a citizen of the United States of America, residing at Wellsville, in the county of Columbiana and State of Ohio, have invented certain new and useful Improvements in Reamers and Augers, of which the following is a specification, reference being had therein to the accompanying drawing.

This invention relates to an auger and reamer, and more particularly to that type of instrument used for boring a hole in a barrel or similar receptacle, to receive a bung, stopper or spigot.

The primary object of the invention is to provide an instrument of the above character, wherein provision is made for maintaining the instrument in a perfect condition for reaming an opening.

Another object of this invention is to provide an instrument of the above type with a two part separable body and to furnish novel means for retaining the separable parts of the body together.

These and such other objects as may hereinafter appear are attained by providing an auger and reamer with a detachable reamer blade, the blade being easily and quickly removed when it is desired to sharpen or repair the same.

It is the present practice to make the reamer body of an auger of a single piece of material and slot or slit the same to provide a cutting edge, and it is in connection with this type of auger and reamer that considerable trouble is experienced in maintaining the cutting edge in a perfect condition, it being almost impossible to properly sharpen or temper the same. The above defect is obviated by making the reamer body in two parts and providing a detachable reamer blade, which can be easily and quickly removed, sharpened and replaced in the reamer body.

By my improved construction I provide a reamer body that will outwear the life of numerous blades used in connection with the same, thereby saving considerable expense heretofore incurred by renewing the reamer body each time the cutting edge thereof was worn and rendered useless for the purpose for which it is intended.

With this understanding of the objects of my invention, reference will now be had to the drawing forming a part of this specification, wherein there is illustrated a preferred embodiment of the invention, but it is to be understood that the structural elements thereof can be varied or changed as to the size, shape and manner of assemblage without departing from the spirit and scope of the invention.

In the drawings: Figure 1 is an elevation of the auger and reamer, Fig. 2 is a horizontal sectional view of the same taken on the line X—X of Fig. 1, Fig. 3 is an elevation of one of the sections or parts of the instrument, Fig. 4 is a similar view of the other section or part of the instrument, Fig. 5 is a plan of the instrument, Fig. 6 is a vertical sectional view of the head of the instrument, and Fig. 7 is a similar view of the tip of the instrument.

In the accompanying drawings, 1 and 2 denote sections or parts adapted to form the conical shaped body of the instrument, each section having the large end thereof provided with a semi-cylindrical sleeve 3, while the smaller end of each section is provided with a semi-cylindrical plug 4. The semi-cylindrical sleeves 3 and the plugs 4 are exteriorly screw threaded, for a purpose that will hereinafter appear.

The section 1 is provided with a conical shaped recess 5 communicating with the semi-cylindrical sleeve 3 of said section. The section 1 at one edge thereof is cut away, as at 6, to provide a pair of shoulders 6ª and in connection with the section 2, a passage for the shavings as will presently appear.

The section 2 is provided with a conical shaped recess 7 adapted to register with the recess 5 of the section 1 when said sections are secured together. The section 2 at one edge thereof is reinforced in a longitudinal direction, the said reinforced portion being cut-away to provide a pair of shoulders 8. The reinforced portion of the section 2 forms a seat for a reamer blade or cutter 10, the latter is secured to the section 2 by the holdfast devices 11. The blade 10 is positioned between the shoulders 8 and is of less thickness than the width of the shoulders 8. When the sections 1 and 2 are secured together, the shoulders 8 abut against the shoulders 6ª. Between the pairs of abutting shoulders 8 and 6ª is formed a shavings passage indicated at 10ª. The section 2 is provided with a plug 4 at one end opposing the plug 4 of the section 1 and the other end of the section 2 is provided with a semi-cylindrical sleeve 3 which opens into the recess 7 and abuts against the sleeve 3 of the section 1.

The sections 1 and 2 are connected together through the medium of a tip 13 and a head 14, the former screwing upon the plugs 4 at the smaller ends of the sections, while the latter screws upon the semi-cylindrical sleeves 3 of the section 2. The tip 13 is conical shaped, whereby the periphery thereof will be flush with the periphery of the body of the instrument, and the extreme outer end of the tip has the sides thereof flattened, as at 15, to receive a wrench or similar instrument (not shown) employed for screwing the tip into engagement with the body of the instrument. The tip 13 is provided with a vertical interiorly screw threaded bore 16 to receive an auger 17.

The head 14 is provided with diametrically opposed openings 18 communicating with the recesses 5 and 7 through the medium of the sleeves 3, these openings 18 allowing shavings from a barrel or similar receptacle to pass through the instrument as the opening in the barrel or receptacle is reamed. The upper end of the head 14 is contracted or reduced and provided with a transverse opening 19 for a handle 20. The lower end of the head 14 is preferably cylindrical, whereby the periphery thereof will be flush with the outer surface of the conical shaped body of the instrument, while the contracted or reduced end thereof is rectangular, as best shown in Figs. 1 and 5.

In order that the sectional body of the instrument can be held in a vise should the auger tip 13 or the handle head 14 become stuck or locked upon the ends of the body, the sections 1 and 2 are provided with alining openings 21 permitting of a pin (not shown) being inserted through the body for a vise grip upon the body.

The conical shaped reamer body permits of various sizes of openings being drilled in a barrel or similar receptacle, while the recesses 5 and 7, sleeves 3 and openings 18 provide sufficient clearance for shavings from the blade 10.

Having now described my invention what I claim as new, is:—

1. A tool of the class described comprising a hollow conoidal-shaped body formed of a pair of separable sections, one of which has one side reinforced and the reinforced portion cut-away to provide a seat and a pair of shoulders, and the other of which has one edge cut-away to provide a pair of shoulders, the shoulders of one section adapted to abut against the shoulders of the other section whereby the openings formed between the shoulders constitute a shavings passage, a blade mounted between the shoulders of said reinforced section and against said seat, said blade of less thickness than the width of the shoulders between which it is mounted, means extending through the blade and engaging in the reinforced section for securing the blade in position, each of said sections having one end thereof provided with a semi-cylindrical exteriorly-threaded extension forming a passage communicating with the interior of the body when the sections are secured together, means engaging the lower ends of said sections for connecting them together, and a hollow handle head engaging with said extensions for connecting the sections together at one end and further communicating with the passage formed by the semi-cylindrical extensions, said head provided with openings for the discharge of shavings.

2. A tool of the class described comprising a hollow conoidal-shaped body formed of a pair of separable sections, one of which has one side reinforced and the reinforced portion cut-away to provide a seat and a pair of shoulders, and the other of which has one edge cut-away to provide a pair of shoulders, the shoulders of one section adapted to abut against the shoulders of the other section whereby the openings formed between the shoulders constitute a shavings passage, a blade mounted between the shoulders of said reinforced section and against said seat, said blade of less thickness than the width of the shoulders between which it is mounted, means extending through the blade and engaging in the reinforced section for securing the blade in position, a hollow handle head engaging with said section for connecting them together and communicating with the interior of the sections, said head having openings for the passage of shavings, and means engaging with the other ends of said sections for securing them together.

In testimony whereof I affix my signature in the presence of two witnesses.

WILLIAM G. LLOYD.

Witnesses:
J. F. McQueen,
Wm. B. Lloyd.